April 19, 1932.  J. P. REMINGTON  1,854,910
DIFFERENTIAL MECHANISM
Filed May 23, 1929   2 Sheets-Sheet 1
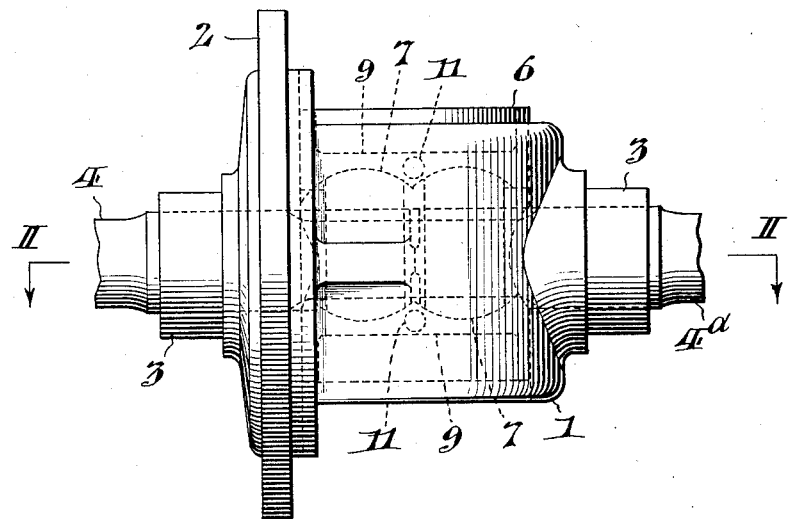
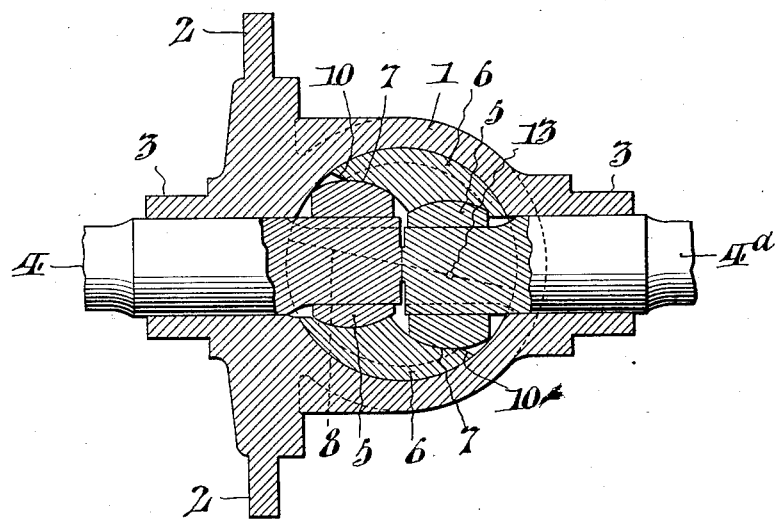
WITNESSES
INVENTOR:
Joseph Percy Remington,
BY
ATTORNEYS.

April 19, 1932. J. P. REMINGTON 1,854,910
DIFFERENTIAL MECHANISM
Filed May 23, 1929  2 Sheets-Sheet 2
FIG. III.
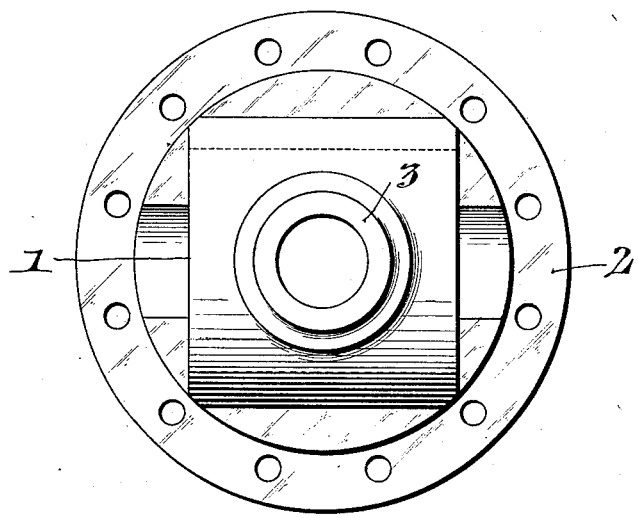
FIG. IV.
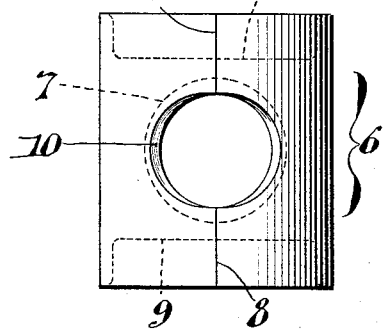
FIG. V.
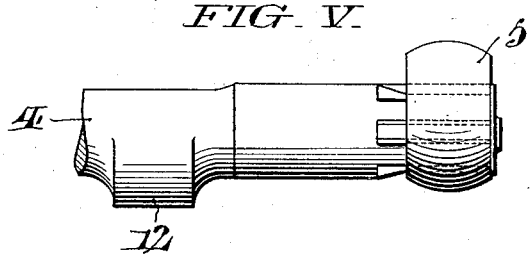
FIG. VI.
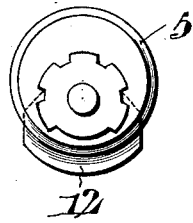
WITNESSES
Thomas W. Kerr, Jr.
William Bell
INVENTOR:
Joseph Percy Remington,
BY Raleigh Paul
ATTORNEYS.

Patented Apr. 19, 1932

1,854,910

UNITED STATES PATENT OFFICE

JOSEPH PERCY REMINGTON, OF PHILADELPHIA, PENNSYLVANIA

DIFFERENTIAL MECHANISM

Application filed May 23, 1929. Serial No. 365,247.

This invention relates to differential mechanism, to be used wherever it is desired to transmit power from a driving shaft to two driven shafts in various proportions of torque and speed, such as is applicable to driving the rear wheels of automobiles and the like.

The primary object of this invention is to provide a rugged durable differential mechanism comprising but few parts; that is capable of production and manufacture at lower cost than the conventional floating-gear type differential; and which is not subject to the well known limitations in torque delivery of such devices.

Further objects are to provide a gearless differential in which differentiation may occur only when both wheels of an automobile, for instance, have traction; to cause power to be applied to the non-slipping wheel, in case one wheel is "mired"; to prevent spinning of a free wheel; and to apply more power to the inside wheel when turning or skidding, thereby tending to right the car and improve steering as well as braking.

With the aforesaid objects in view, my invention essentially consists in the provision of a mechanism, possessing the noted characteristics, that applies purely tangential forces equivalent to gear tooth pressures, but which act upon larger areas of contact and without excessive axial thrust pressures.

In the drawings:—

Fig. I is a side view of the differential showing the eccentrics in phase.

Fig. II is a section on line II—II of Fig. I, except that the eccentrics are shown out of phase.

Fig. III is an end view of the cage or casing looking to the left of Fig. I.

Fig. IV is a side view of the cross-head.

Fig. V is a view of one eccentric in position on its axle and showing the method of counterbalancing; and, Fig. VI is an end view looking toward the left-hand of the preceding illustration.

Referring more in detail to the drawings, I make use of a one-piece cage or casing 1 having a flange 2 to which the conventional ring gear—not shown— is bolted or riveted and, said casing is furnished with hubs 3, over which the conventional roller bearings—likewise not illustrated—may be fitted into the standard design of axle housing.

The axles 4, 4a abut within the cage or casing 1 and are journaled in the hubs 3; while the eccentrics 5 are splined to said axles, as is customary with the usual bevel gears.

Driving connection between the cage or casing 1 and the axles 4, 4a, is provided by a large cylindrical cross-head 6 fitting into said casing, which is bored out to receive it. This cross-head 6 is formed with internal spherical-surfaces constituting sockets 7, into which the spherical eccentrics 5 fit, and it is split on its centre line—as indicated at 8, Fig. 4—to permit assembly of said eccentrics within such sockets. The cross-head 6 is hollowed out at either end—9, Fig. 4—to decrease weight, without reducing the bearing surface, and it is also circumferentially chamfered, as at 10, so as to permit rocking, as far as the position shown in Fig. II. The two components of the cross-head 6 may be riveted together, as at 11—Fig. I, for machining; while said rivets may be replaced or omitted after inserting the eccentrics 5. The cross-head 6 is amply supported by the wall of the cage or casing 1 with, or without, the rivets 11.

Since there is one driving position in which the mechanism will be unbalanced, as shown in Fig. I, or when both eccentrics 5 are to one side of the axles 4, 4a, it may be desirable to counterbalance it; and this may be effected by providing a pad 12 on each axle 4, 4a, equal to half the total unbalanced weight; while registration of this pad 12 with the associated eccentric may be secured by eliminating one groove of the spline, in an obvious manner.

It will be noted that my novel differential consists of five parts; a cage or casing 1 which is driven by the usual ring gear or worm wheel; two duplicate eccentrics 5 splined one to each axle 4, 4a, and a cross-head 6 in duplicate sections. The cross-head 6 thus becomes the sole means of transmitting the power from the cage or casing 1 to the axles 4, 4a.

The use of eccentrics 5 instead of gears on the axles 4, 4a, involves the necessity of providing a well supported construction with ample areas to carry the pressures. In this invention the diameter of the cross-head may be as large as 3½ inches and its length 3½ to 4 inches, without exceeding present housing dimensions on small cars. Thus more liberal margins of safety are provided for ultimate strength and wear than in gear tooth constructions, even though the actual pressures are higher.

The operation of my novel differential mechanism is as follows:

When driving straight ahead, or in reverse, the cage or casing 1, cross-head 6, and eccentrics 5 do not move with reference to each other but all revolve as a unit; and, hence, full power is delivered equally to both wheels.

When the eccentrics 5 are, however, in the position of Fig. I; or, where they are in "phase" but out of balance—unless counterbalanced; or, said eccentrics may be in the position of Fig. II, where they are out of "phase" but in balance—whether counterbalanced or not; or, again one eccentric may be say 45° above the horizontal to one side and the other 45° above the horizontal on the opposite side. In any of such positions, however, or at intermediate points in the quadrants the angle which one eccentric 5 makes with the axis of the cross-head 6 always equals the other and the drive is direct, equal on both wheels, and with full power.

Assuming a vehicle is turning on a curve to the left, the right wheel has to go faster than the average speed of both wheels, and the left wheel has to go slower than such average; and, if the outside wheel simply overran without power, the vehicle would accelerate on curves. In a vehicle equipped with my novel differential the right wheel is perfectly free to turn faster, provided only that the left wheel is, at the same time, turned slower. The increased road resistance on the right or outside wheel and the decreased road resistance on the left or inside wheel furnishes the power to turn the wheels in opposite directions.

Under these requirements of differentiation the right-hand eccentric 5 will be turned clock-wise looking at Fig. II from the right, and the left-hand eccentric 5 will be turned counterclockwise. This they are perfectly free to do since the cross-head 6 will both rotate and rise until it assumes the "in-phase" (Fig. I) position; whereas the same movements will naturally occur in all four quadrants.

It is a well known characteristic of an eccentric that it is irreversible within the limits of its eccentricity. Very little rotary power applied to an eccentric will easily reciprocate the strap, but very great power must be applied to said strap to rotate the eccentric, the eccentric being merely a double circular wedge.

The proportions of my novel differential are such that the application of the available pressures to the cross-head 6 will not cause rotation of the eccentrics 5; therefore, both eccentrics 5 must be turned in opposite directions to cause differential action, because otherwise the cross-head 6 would have to rotate one of said eccentrics, and this it cannot do. For this reason the free wheel cannot spin, and traction will be afforded either wheel in case the other slips.

More power is applied to the inside wheel on turning or skidding because, as the outside wheel runs faster, the eccentric on that side is moving into a zone of lower cross-head pressure, while the other eccentric is moving into a zone of higher pressure. This also tends to straighten the vehicle out in case it starts to skid under acceleration and thus improves control. In deceleration or breaking, the same advantage exists if the engine is in clutch.

The pressures are tangential because the contact faces of the eccentrics 5 and sockets 7 are spherical and all axial thrust pressures are avoided in straight driving. In turning it is to be noted that the eccentrics 5 must slide toward, and away from, the centre of the cross-head 6 about $\frac{1}{32}$ of an inch as shown at 13—Fig. II; such movement being similar to, but somewhat greater than that which occurs with bevel pinion splines on turning.

Having thus described my invention, I claim:

1. A differential mechanism for aligned axle sections comprising a rotary driven casing, a cylindrical driving member journaled radially free within the casing, and said driving member comprising counterpart components with spherical sockets to receive eccentric spherical heads on the aligned axle sections.

2. A differential mechanism for aligned shaft sections comprising a rotary driven casing, a cylindrical rotating-reciprocable cross-head comprising counterpart components afforded radially free bearing within the casing, said cross-head having spherical sockets therein, and spherical eccentrics in said sockets adapted for connection to the abutting ends of the aligned shaft sections.

3. A differential mechanism comprising a rotary driven casing, a rotating-reciprocable cylindrical cross-head afforded radially free bearing within the casing, said cross-head having spherical sockets therein with opposing circumferential chamferings to accommodate rocking of said cross-head, and spherical eccentrics having splined connection on the abutting ends of aligned shaft components accommodated within the cross head sockets aforesaid.

4. A differential mechanism comprising a rotary driven casing, a rotating and reciprocating cylindrical cross-head afforded bearing radially within the rotary driven casing, said cross-head being parted on a plane including the centres of radially disposed spherical sockets so formed therein and spherical eccentrics accommodated within such sockets and splined on aligned axles abutting within said casing.

5. A differential mechanism comprising a power driven rotary casing, a cylindrical rotating and reciprocating cross-head radially journaled in the casing, said cross-head comprising components with radially disposed spherical sockets therein, a pair of spherical eccentrics slidably splined on aligned axles afforded bearing in the sockets in the cross-head, said eccentrics being adapted to lock with the cross-head by rotary power applied to the latter and to release such lock when rotary power opposite in direction is applied to each eccentric.

6. A differential mechanism comprising a power driven rotary casing, a cylindrical rotating and reciprocating cross-head radially journaled in the casing, a pair of spherical eccentrics slidably splined on aligned axles, said eccentrics being afforded bearing in radially disposed corresponding sockets formed in the cross-head, said axles having pads functional to counterbalance the eccentrics when both are to one side thereof, and the spherical eccentrics being adapted to lock with the cross-head by rotary power applied to the latter and to release such lock when rotary power opposite in direction is applied to each eccentric.

In testimony whereof, I have hereunto signed my name at Philadelphia, Pennsylvania, this 20th day of May, 1929.

JOSEPH PERCY REMINGTON.